(12) United States Patent
Magwood et al.

(10) Patent No.: US 12,286,353 B2
(45) Date of Patent: Apr. 29, 2025

(54) PROCESS FOR IN-SITU FUNCTIONALIZATION OF GRAPHENE

(71) Applicant: NanoXplore inc., Montreal (CA)

(72) Inventors: Leroy Magwood, Rancho Cucamonga, CA (US); Scott Murray, East Lansing, MI (US); Trent Hinze, St. Johns, MI (US)

(73) Assignee: NanoXplore Inc., Montreal (CA)

( * ) Notice: Subject to any disclaimer, the term of this patent is extended or adjusted under 35 U.S.C. 154(b) by 0 days.

(21) Appl. No.: 18/601,495

(22) Filed: Mar. 11, 2024

(65) Prior Publication Data

US 2025/0033973 A1   Jan. 30, 2025

Related U.S. Application Data

(63) Continuation of application No. 17/613,194, filed as application No. PCT/US2020/034535 on May 26, 2020, now abandoned.

(Continued)

(51) Int. Cl.
  *C01B 32/19* (2017.01)
  *B29C 45/00* (2006.01)
(52) U.S. Cl.
  CPC .......... *C01B 32/19* (2017.08); *B29C 45/0013* (2013.01); *B29K 2995/0093* (2013.01)
(58) Field of Classification Search
  CPC ... C01B 32/19; C01B 32/194; B29C 45/0013; B29K 2995/0093
  See application file for complete search history.

(56) References Cited

U.S. PATENT DOCUMENTS

| 5,871,586 A | 2/1999 | Crawley et al. |
| 7,071,258 B1 | 7/2006 | Jang et al. |

(Continued)

FOREIGN PATENT DOCUMENTS

| CN | 101121878 A | 2/2008 |
| CN | 102225759 A | 10/2011 |

(Continued)

OTHER PUBLICATIONS

Final Office Action for U.S. Appl. No. 15/285,967, mailed May 16, 2019, 11 pages.

(Continued)

*Primary Examiner* — Richard M Rump
(74) *Attorney, Agent, or Firm* — COOLEY LLP

(57) ABSTRACT

A process for in situ functionalization of graphene including placing a graphitic precursor in an exfoliation cannister with exfoliation media; creating an inert atmosphere in the exfoliation cannister; exfoliating the graphitic precursor to form graphene having carboxyl moieties; and reacting the carboxyl moieties in the exfoliation cannister under conditions, such as a temperature of between 260 and 500° C., and in the presence of a substance to chemically reduce or react the carboxyl moieties during the exfoliating to produce hydrophobic graphene. Additionally, a process of molding an article including intermixing a thermoplastic in a molten state with hydrophobic graphene produced by an in situ functionalization process to form a dispersion of the hydrophobic graphene in the thermoplastic; injecting a melt of the dispersion of the hydrophobic graphene in the thermoplastic into a mold having a cavity complementary to the article; and allowing the melt to cool to form the article.

6 Claims, 3 Drawing Sheets

Related U.S. Application Data

(60) Provisional application No. 62/851,774, filed on May 23, 2019.

(56) References Cited

U.S. PATENT DOCUMENTS

| | | | |
|---|---|---|---|
| 7,566,410 B2 | 7/2009 | Song et al. |
| 7,623,340 B1 | 11/2009 | Song et al. |
| 7,662,321 B2 | 2/2010 | Guo et al. |
| 7,745,047 B2 | 6/2010 | Zhamu et al. |
| 7,785,492 B1 | 8/2010 | Jang et al. |
| 7,790,285 B2 | 9/2010 | Zhamu et al. |
| 7,824,651 B2 | 11/2010 | Zhamu et al. |
| 7,875,219 B2 | 1/2011 | Zhamu et al. |
| 7,886,813 B2 | 2/2011 | Hua et al. |
| 7,892,514 B2 | 2/2011 | Jang et al. |
| 7,897,283 B2 | 3/2011 | Matsumoto et al. |
| 7,999,027 B2 | 8/2011 | Zhamu et al. |
| 8,084,121 B2 | 12/2011 | Yonetake et al. |
| 8,114,373 B2 | 2/2012 | Jang et al. |
| 8,114,375 B2 | 2/2012 | Jang et al. |
| 8,119,288 B2 | 2/2012 | Zhamu et al. |
| 8,132,746 B2 | 3/2012 | Zhamu et al. |
| 8,192,643 B2 | 6/2012 | Zheng et al. |
| 8,216,541 B2 | 7/2012 | Jang et al. |
| 8,222,190 B2 | 7/2012 | Zhamu et al. |
| 8,241,793 B2 | 8/2012 | Zhamu et al. |
| 8,268,902 B2 | 9/2012 | Casalini et al. |
| 8,278,757 B2 | 10/2012 | Crain et al. |
| 8,414,799 B2 | 4/2013 | Pu et al. |
| 8,501,318 B2 | 8/2013 | Jang et al. |
| 8,501,348 B2 | 8/2013 | Zhamu et al. |
| 8,524,067 B2 | 9/2013 | Zhamu et al. |
| 8,580,432 B2 | 11/2013 | Zhamu et al. |
| 8,611,070 B2 | 12/2013 | Ivanovici et al. |
| 8,652,687 B2 | 2/2014 | Zhamu et al. |
| 8,672,246 B2 | 3/2014 | Lee et al. |
| 8,696,938 B2 | 4/2014 | Zhamu et al. |
| 8,697,485 B2 | 4/2014 | Crain et al. |
| 8,747,623 B2 | 6/2014 | Zhamu et al. |
| 8,753,539 B2 | 6/2014 | Zhamu et al. |
| 8,753,543 B2 | 6/2014 | Zhamu et al. |
| 8,753,740 B2 | 6/2014 | Zhamu et al. |
| 8,765,302 B2 | 7/2014 | Chen et al. |
| 8,784,694 B2 | 7/2014 | Kay |
| 8,784,695 B2 | 7/2014 | Choi et al. |
| 8,795,899 B2 | 8/2014 | Liu et al. |
| 8,865,113 B2 | 10/2014 | Shankman |
| 8,871,296 B2 | 10/2014 | Zhamu et al. |
| 8,883,114 B2 | 11/2014 | Zhamu et al. |
| 9,327,981 B2 | 5/2016 | Gee et al. |
| 9,469,542 B2 | 10/2016 | Bozalina et al. |
| 9,586,825 B2 | 3/2017 | Bozalina et al. |
| 9,890,046 B2 | 2/2018 | Bozalina et al. |
| 10,322,935 B2 | 6/2019 | Bozalina et al. |
| 10,519,040 B2 | 12/2019 | Bozalina et al. |
| 10,568,544 B2 | 2/2020 | Fukushima et al. |
| 11,367,540 B2 | 6/2022 | Bozalina et al. |
| 11,407,643 B2 | 8/2022 | Bozalina et al. |
| 12,006,220 B2 | 6/2024 | Bozalina et al. |
| 2001/0048172 A1 | 12/2001 | Smith et al. |
| 2008/0118736 A1 | 5/2008 | Drzal et al. |
| 2008/0291634 A1 | 11/2008 | Weiser et al. |
| 2009/0008779 A1 | 1/2009 | Suhir et al. |
| 2009/0022649 A1 | 1/2009 | Zhamu et al. |
| 2009/0169467 A1 | 7/2009 | Zhamu et al. |
| 2009/0324897 A1 | 12/2009 | Choi et al. |
| 2010/0056819 A1 | 3/2010 | Jang et al. |
| 2010/0140792 A1 | 6/2010 | Haddon et al. |
| 2010/0222482 A1 | 9/2010 | Jang et al. |
| 2011/0308782 A1 | 12/2011 | Merrill et al. |
| 2011/0319554 A1 | 12/2011 | Frazier et al. |
| 2012/0077035 A1 | 3/2012 | Spahr et al. |
| 2012/0080639 A1 | 4/2012 | Bruzda et al. |
| 2013/0018204 A1 | 1/2013 | Jeon et al. |
| 2013/0161199 A1 | 6/2013 | Li et al. |
| 2013/0211106 A1 | 8/2013 | El-Shall et al. |
| 2013/0221268 A1 | 8/2013 | Sung et al. |
| 2013/0309495 A1 | 11/2013 | Do et al. |
| 2014/0011034 A1 | 1/2014 | Majumder et al. |
| 2014/0025578 A1 | 1/2014 | Evans |
| 2014/0044968 A1 | 2/2014 | Papakonstantinou et al. |
| 2014/0085813 A1 | 3/2014 | Sedarous |
| 2014/0120399 A1 | 5/2014 | Balandin |
| 2014/0255785 A1 | 9/2014 | Do et al. |
| 2014/0308782 A1 | 10/2014 | Chan et al. |
| 2014/0328024 A1 | 11/2014 | Mataya et al. |
| 2014/0345843 A1 | 11/2014 | Kirkor et al. |
| 2015/0014577 A1 | 1/2015 | Chowdhury et al. |
| 2015/0148459 A1 | 5/2015 | Pawloski et al. |
| 2015/0274532 A1 | 10/2015 | Fujiwara et al. |
| 2015/0279506 A1 | 10/2015 | Wolfrum et al. |
| 2016/0151786 A1 | 6/2016 | Murray et al. |
| 2016/0169598 A1 | 6/2016 | Semenic et al. |
| 2016/0185603 A1 | 6/2016 | Bozalina et al. |
| 2016/0201784 A1 | 7/2016 | Murray et al. |
| 2016/0340194 A1 | 11/2016 | Bozalina et al. |
| 2017/0096343 A1 | 4/2017 | Bozalina et al. |
| 2017/0101571 A1 | 4/2017 | Fukushima et al. |
| 2017/0225953 A1 | 8/2017 | Bozalina et al. |
| 2018/0201509 A1 | 7/2018 | Bozalina et al. |
| 2020/0031674 A1 | 1/2020 | Bozalina et al. |
| 2020/0207626 A1 | 7/2020 | Bozalina et al. |
| 2022/0194799 A9 | 6/2022 | Bozalina et al. |
| 2022/0234896 A1 | 7/2022 | Magwood et al. |
| 2023/0005638 A1 | 1/2023 | Bozalina |
| 2023/0062310 A1 | 3/2023 | Bozalina et al. |

FOREIGN PATENT DOCUMENTS

| | | |
|---|---|---|
| CN | 102341474 A | 2/2012 |
| CN | 103288078 A | 9/2013 |
| CN | 103407998 A | 11/2013 |
| CN | 103570004 A | 2/2014 |
| CN | 103626162 A | 3/2014 |
| CN | 103708445 A | 4/2014 |
| CN | 104541358 A | 4/2015 |
| CN | 104969344 A | 10/2015 |
| KR | 20140138577 A | 12/2014 |
| KR | 101502390 B1 | 3/2015 |
| WO | WO-2011054305 A1 | 5/2011 |
| WO | WO-2012058553 A2 | 5/2012 |
| WO | WO-2012117251 A1 | 9/2012 |
| WO | WO-2014053510 A1 | 4/2014 |
| WO | WO-2014138596 A1 | 9/2014 |
| WO | WO-2015103435 A1 | 7/2015 |
| WO | WO-2015184555 A1 | 12/2015 |
| WO | WO-2016090481 A1 | 6/2016 |
| WO | WO-2017062697 A2 | 4/2017 |
| WO | WO-2020237241 A1 | 11/2020 |

OTHER PUBLICATIONS

Grant Decision for Chinese Application No. 201680070947.7, mailed Jul. 2, 2020, 3 pages.

International Search Report and Written Opinion for Application No. PCT/US2016/055873, mailed Dec. 27, 2017, 12 pages.

Non-Final Office Action for U.S. Appl. No. 15/285,967, mailed Oct. 30, 2018, 9 pages.

Non-Final Office Action for U.S. Appl. No. 17/739,949 mailed Oct. 16, 2024, 9 pages.

Notice of Allowance for Korean Application No. 10-2018-7012791 mailed Jul. 31, 2024, 6 pages.

Notice of Allowance for U.S. Appl. No. 15/285,967, mailed Sep. 24, 2019, 13 pages.

Office Action for Chinese Application No. 201680070947.7, mailed Nov. 4, 2019, 25 pages.

Office Action for Korean Application No. KR1020187012791 dated Oct. 26, 2023, 12 pages.

Restriction Requirement for U.S. Appl. No. 15/285,967, mailed Jul. 27, 2018, 11 pages.

(56) References Cited

OTHER PUBLICATIONS

Abdolmaleki et al., "Structure, morphology and electronic properties of L-phenylalanine edge-functionalized graphite platelets through Friedel-Crafts acylation reaction," RSC Advances, 2014, 4(140), 60052-60057.
Aparna, R. et al., "An effective route to produce few-layer graphene using combinatorial ball milling and strong aqueous exfoliants," Journal of Renewable Sustainable Energy 5: 033123, May 2013; doi: 10.1063/1.4809794, 12 pages.
Araby et al., "Electrically and thermally conductive elastomer/graphene nanocomposites by solution mixing," Polymer, Jan. 2014, 55(1), pp. 201-210.
Araby S., et al., "A Novel Approach to Electrically and Thermally Conductive Elastomers Using Graphene," Polymer, 54(14), Jun. 2013, pp. 3663-3670.
Baeck et al., "Edge-iodine/sulfonic acid-functionalized graphene nanoplatelets as efficient electrocatalysts for oxygen reduction reaction," Journal of Materials Chemistry A, 2014, 2, 8690-8695.
Chen, Tong Yang, "Study of Few Layer Graphene Synthesised by Interlayer Catalytic Exfoliation Method," (Doctoral Dissertation, UTAR,) Apr. 2019, 87 pages.
Chua et al., "Chemical reduction of graphene oxide: a synthetic chemistry viewpoint," Chemical Society Reviews, 2014, 43(1), pp. 291-312.
Eigler, S. & Hirsch, A., "Chemistry with Graphene and Graphene Oxide—Challenges for Synthetic Chemists," Angewandte Chemie International Edition, Jul. 2014, 53(30), pp. 7720-7738.
Examination Report dated Aug. 2, 2019 for Australian Application No. 2019205999, 5 pages.
Examination Report dated Jan. 13, 2021 for European Application No. 15867576.9, 3 pages.
Examination Report dated Jan. 26, 2022 for Canadian Application No. 2,969,854, 3 pages.
Examination Report dated Jan. 8, 2019 for Australian Application No. 2015271619, 5 pages.
Examination Report dated Jun. 2, 2021 for Canadian Application No. 2,947,776, 4 pages.
Examination Report dated Oct. 3, 2018 for Australian Application No. 2015362043, 2 pages.
Examination Report No. 1 dated Apr. 20, 2018 for Australian Application No. 2015271619, 4 pages.
Extended European Search Report dated Feb. 28, 2018 for European Application No. 15802987.6, 12 pages.
Extended European Search Report dated Jul. 4, 2018, for European Application No. 15867576.9, 7 pages.
Final Office Action mailed Jun. 11, 2021 for U.S. Appl. No. 16/409,153, 9 pages.
Final Office Action mailed Mar. 13, 2019 for U.S. Appl. No. 15/854,419, 14 pages.
International Search Report and Written Opinion for Application No. PCT/US2020/034535, mailed Sep. 15, 2020, 12 pages.
International Search Report and Written Opinion mailed Feb. 15, 2016 for International Application No. PCT/CA2015/051292, 9 pages.
International Search Report and Written Opinion mailed Sep. 1, 2015 for International Application No. PCT/CA2015/050525, 8 pages.
Jin et al., "Synthesis and Systematic Characterization of Functionalized Graphene Sheets Generated by Thermal Exfoliation at Low Temperature," Journal of Physics D: Applied Physics, vol. 43, No. 27, Jun. 2010, 275402, 7 pages.
Knieke, C. et al., "Scalable production of graphene sheets by mechanical delamination," Carbon 48(11), Sep. 2010, pp. 3196-3204.
Leon, V. et al., "Exfoliation of Graphite with Triazine Derivatives under Ball-Milling Conditions: Preparation of Few-Layer Graphene via Selective Noncovalent Interactions," ACS Nano, 8(1), Jan. 2014, pp. 563-571.
Liu et al., "Production of high quality single-or few-layered graphene by solid exfoliation of graphite in the presence of ammonia borane," Chemical Communications, 2013, 49(72), 7890-7892.
Moreno-Castilla et al., "Effects of non-oxidant and oxidant acid treatments on the surface properties of an activated carbon with very low ash content," Carbon, Jan. 1998, vol. 36, Nos. 1-2, pp. 145-151.
Non-Final Office Action for U.S. Appl. No. 17/613,194 dated Sep. 6, 2023, 14 pages.
Non-Final Office Action for U.S. Appl. No. 17/739,949 dated Aug. 25, 2023, 12 pages.
Non-Final Office Action mailed Feb. 15, 2018, for U.S. Appl. No. 15/270,855, 7 pages.
Non-Final Office Action mailed Jul. 2, 2018, for U.S. Appl. No. 15/854,419, 6 pages.
Non-Final Office Action mailed May 26, 2016, for U.S. Appl. No. 14/978,566, 12 pages.
Non-Final Office Action mailed Sep. 30, 2020, for U.S. Appl. No. 16/409,153, 8 pages.
Nonomura, Y. et al., "Anomalously stable dispersions of graphite in water/acetone mixtures," Journal of Colloid and Interface Science 346, Jun. 2010, pp. 96-99.
Notice of Allowance dated Apr. 20, 2021 for U.S. Appl. No. 15/854,419, 11 pages.
Notice of Allowance dated Apr. 6, 2022 for U.S. Appl. No. 16/692,201, 7 pages.
Nuvoli, D. et al., "High concentration few-layer graphene sheets obtained by liquid phase exfoliation of graphite in ionic liquid," published electronically on Dec. 20, 2010, Journal of Materials Chemistry 21(10): 3428-3431.
Perepelytsina et al., "Functionalization of carbon nanomaterial surface by doxorubicin and antibodies to tumor markers," Nanoscale Research Letters, Dec. 2016, 11, pp. 1-13.
Powell, M. et al., "The Selection and Design of Mill Liners," In Advances in Comminution, Ed. S.K. Kawatra. ISBN-13: 978-0-87335-246-8, Society for Mining, Metallurgy, and Exploration, Inc., Colorado, USA, Jan. 2006, pp. 331-376.
Prentice et al., "Gas-Phase reactivity of carboxylic acid functional groups with carbodiimides," Journal of the American Society for Mass Spectrometry, 2013, Published: Dec. 4, 2012, 24(1), pp. 30-37.
Schniepp et al., "Functionalized single graphene sheets derived from splitting graphite oxide," The Journal of Physical Chemistry B, May 2006, 110(17), pp. 8535-8539.
Shanmugharaj et al., "Synthesis, characterization, and surface wettability properties of amine functionalized graphene oxide films with varying amine chain lengths," Journal of Colloid and Interface Science, Jul. 1, 2013, vol. 401, pp. 148-154.
Shen, T. D. et al., "Structural disorder and phase transformation in graphite produced by ball milling," Nanostructured Materials, 7(4), May 1996, pp. 393-399.
Sun, L., "Unexpected colloid-like supernatant from liquid-phase ball-milling graphite using miscible solutions as solvents: a failure analysis," online http://arxiv.org/ftp/arxiv/papers/1309/1309.1056 , Sep. 4, 2013, 6 pages.
Tang, Q. et al., "Crystallization degree change of expanded graphite by milling and annealing," Journal of Alloys and Compounds 475, May 2009, pp. 429-433.
Turkevich et al., "Palladium: Preparation and catalytic properties of particles of uniform size," Science, Aug. 1970, 169(3948), pp. 873-879.
Wang et al., "Hydrocarbon fuels from gas phase decarboxylation of hydrolyzed free fatty acid", Journal of Energy Resources Technology, Sep. 2012, vol. 134, No. 3, Article No. 032203, pp. 1-7.
Wang et al., "Preparation, characterization, and chemical-induced hydrophobicity of thermostable amine-modified graphene oxide," RSC Advances, 2015, vol. 5, No. 127, pp. 105393-105399.
Woltornist, S. J. et al., "Conductive Thin Films of Pristine Graphene by Solvent Interface Trapping," ACS Nano 7(8), Aug. 2013, pp. 7062-7066.
Xing, W. et al., "Degradation of Graphene by Hydrogen Peroxide," Particle & Particle Systems Characterization, 31(7), Jul. 2014, pp. 745-750.

(56) References Cited

OTHER PUBLICATIONS

Yamanaka, S. et al., "Production of thin graphite sheets for a high electrical conductivity film by the mechanical delamination of ternary graphite intercalation compounds," Carbon 50, Nov. 2012, pp. 5027-5033.

Yan, L. et al., "Electroactive and biocompatible hydroxyl-functionalized graphene by ball milling," Journal of Materials Chemistry 22, Feb. 2012, pp. 8367-8371.

Zhang, D. et al., "High performance supercapacitor electrodes based on deoxygenated graphite oxide by ball milling," Electrochimica Acta 109, Oct. 2013, pp. 874-880.

Zhang et al., "Electrically conductive polyethylene terephthalate/graphene nanocomposites prepared by melt compounding," Polymer, Mar. 2010, 51(5), pp. 1191-1196.

Zhang, L. L. et al., "Highly Conductive and Porous Activated Reduced Graphene Oxide Films for High-Power Supercapacitors," Nano Letters 12, Apr. 2012, pp. 1806-1812.

Zhao, W. et al., "Preparation of graphene by exfoliation of graphite using wet ball milling," Journal of Materials Chemistry 20, Jun. 2010, pp. 5817-5819.

Zhou et al., "Realization of ultra-high barrier to water vapor by 3D-interconnection of super-hydrophobic graphene layers in polylactide films," Journal of Materials Chemistry A 5.27 (2017): 14377-14386.

PROCESS FOR IN-SITU FUNCTIONALIZATION OF GRAPHENE

CROSS-REFERENCE TO RELATED APPLICATIONS

This application which is a continuation of U.S. patent application Ser. No. 17/613,194, filed Nov. 22, 2021, which is a national stage application, filed under 35 U.S.C. 371, of PCT Application No. PCT/US2020/034535 filed May 26, 2020, which claims priority of U.S. Provisional Patent Application Ser. No. 62/851,774 filed May 23, 2019, which is incorporated herein by reference.

TECHNICAL FIELD

The present invention generally relates to graphene, and more specifically to a process for producing reduced hydrophilicity of graphene.

BACKGROUND

During the preparation of graphene, interlayer bonds are sheared and otherwise broken to create labile networks, both in the basal plane and edges of the graphene platelet. A variety of techniques have been developed to chemically modify graphene to add or otherwise react moieties present on graphene platelets. These prior efforts have included efforts to modify electrical properties, water solubility. Friedel-Crafts alkylation, Diels-Alder reactions by reacting hydroxyl groups or unsaturations present on the graphene or graphene oxide platelets. (C. Chua et al., Chem. Soc. Rev. 2014, 43, 291-312; A. Abdolmaleki et al., RSC Adv., 2014, 4, 60052-60057). A common feature of these techniques is that the reactions occur subsequent to synthesis and as a result, add cost and limit throughput of the resulting material.

The existing process of ball milling has previously been used to functionalize graphene in situ during milling of a graphitic starting material but has meet with limited success owing to a lack of chemical control over the functional groups that are introduced. (Baek et al, J. Mater. Chem. A. 2014, 2, 8690-8695).

Thus, there exists a need for a refined in situ process to remove hydrophilic moieties or react such moieties to otherwise render them less hydrophilic. There also exists a need for the resulting material as a dispersant in hydrophobic matrices.

SUMMARY OF THE INVENTION

The present invention provides a process for in situ functionalization of graphene that includes placing a graphitic precursor in an exfoliation cannister with exfoliation media; creating an inert atmosphere in the exfoliation cannister; exfoliating the graphitic precursor to form graphene having carboxyl moieties; and reacting the carboxyl moieties in the exfoliation cannister under conditions, such as a temperature of between 260 and 500° C., and in the presence of a substance, such as a catalyst, to chemically reduce or react the carboxyl moieties during the exfoliating to produce hydrophobic graphene.

The present invention also provides a process of molding an article that includes intermixing a thermoplastic in a molten state with hydrophobic graphene produced as described herein to form a dispersion of the hydrophobic graphene in the thermoplastic; injecting a melt of the dispersion of the hydrophobic graphene in the thermoplastic into a mold having a cavity complementary to the article; and allowing the melt to cool to form the article.

BRIEF DESCRIPTION OF THE DRAWINGS

The present invention is further detailed with respect to the following drawings that are intended to show certain aspects of the present of invention, but should not be construed as limit on the practice of the invention, wherein.

DETAILED DESCRIPTION

The present invention has utility as an improved process to functionalize graphene in situ during an exfoliation production. The resulting materials are hydrophobic compared to conventionally exfoliated graphenes. In particular, deoxygenation, or otherwise chemically reducing graphene as it is being exfoliated from a graphitic starting material yields the hydrophobic graphene material. The resulting material is particularly well suited for dispersion in hydrophobic materials such a thermoplastics, aliphatic oils and greases, perfluoropolymers, and polysilicones.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

A graphene monolayer is a crystalline allotrope of carbon in which each carbon atom is bound to three adjacent carbon atoms ($sp^2$-hybridized) so as to define a one atom thick planar sheet of carbon. Graphene is often referred to as a two-dimensional structure because it represents a single sheet or layer of carbon of nominal (one atom) thickness. Multiple layers of graphene can be present to form a stack.

Figure 1:
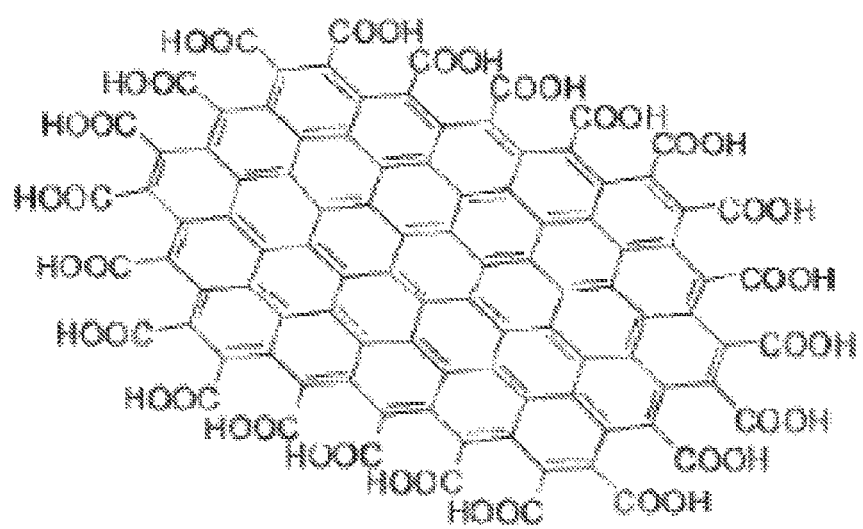
FIG. 1 is a prior art chemical structure of a monolayer of graphene with carboxylated edges.

Graphene material conventionally produced through exfoliation of a graphitic starting material has carboxyl content. While this is shown as a prior art structure in FIG. 1 with edge carboxylation, it is appreciated that the edge carboxylation need not be complete. It is further appreciated that carboxylation defects are also present on sites in the basal plane of the graphene layer. Regardless of the location, carboxylation adds to the hydrophilicity of the graphene and disrupts the electron conduction relative to a purely aliphatic graphene.

Figure 3:
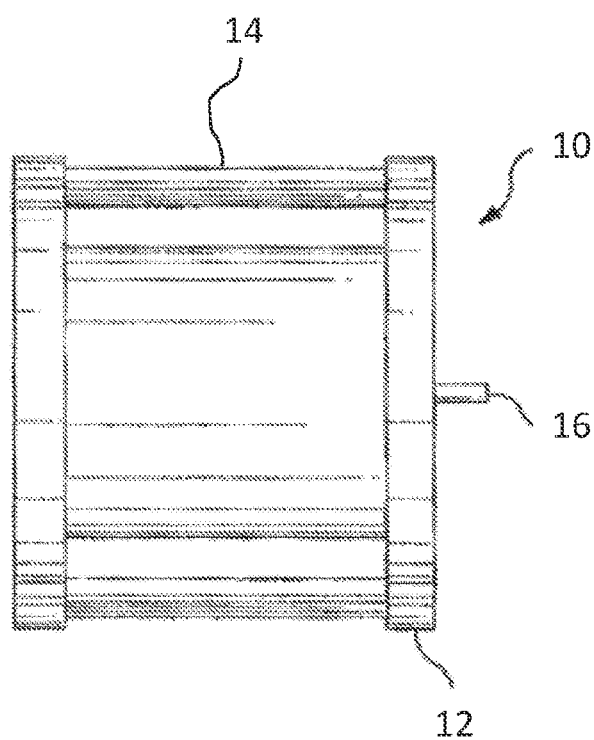
FIG. 3 is a prior art exfoliation cannister operative in processes of the present invention.

The present invention relies on a gas phase reaction during the exfoliation of a graphitic starting material to produce an inventive hydrophobic graphene, as compared to a conventional exfoliated graphene. An inventive process occurs through a controlled environment in an exfoliation apparatus. An exfoliation apparatus that can be adapted for performing an inventive process include conventional ball milling equipment, as well as that detailed in US Patent Application Publication US2016/0201784A1 with the proviso that the atmosphere during exfoliation is controlled. A prior art cannister operative with an inventive process is shown generally at 10 in FIG. 3. The cannister 10 has a cap 12 that is selectively removed to include exfoliation media, such as milling balls and graphitic precursors. The cap 12 upon sealing to the body 14 of the cannister 10 forms a gas tight seal. An atmospheric control valve 16 is provided to allow for controlled evacuation, purging, and addition of a gaseous reactant. As the kinetics of gas phase reactions according to some embodiments of the present invention are temperature dependent, is appreciated that a cannister 10 that is adapted to be heated offers additional options for controlling reaction rates and in some instances, the dominant reaction.

In a particular inventive embodiment, a decarboxylation reaction or any like reaction that would terminate moieties with aliphatics on the surface of the graphene at the expense of carboxyl moieties is of value for the purposes of compatibilization of graphene in thermoplastic matrices.

A gas phase decarboxylation reaction occurs under an inert atmosphere at elevated temperatures of 300 to 500° C. Such an atmosphere is oxygen free and illustratively includes nitrogen, argon, carbon dioxide, ethylene gas, fluorinated gases, and phosphorus containing gases. Typically, unimolecular decarboxylation occurs with a catalyst such as palladium, rhenium, iron trichloride, cyclohexanone, or combinations thereof in the exfoliation cannister. (W. Wang et al., ASME. J. Energy Resour. Technol. 2012; 134(3): 032203-032203-7). It is appreciated the catalyst can then be used with the resulting decarboxylated graphene that acts as a support for the catalyst to perform subsequent catalytic reactions. It has been discovered that the decarboxylation of the graphene substrate during the exfoliation process results in higher rates of catalytic reactions that include functionalization of nitrogen, acrylates, and epoxies, as compared to carboxylated graphene. It has further been discovered that the use of ethylene gas or other gases that impart hydrophobicity provides graphene that is more easily incorporated into thermoplastics. Without intending to be bound to a particular theory, the carboxyl groups are repulsive to hydrophobic reactants and removal the carboxyl groups increase the active surface area of available for reaction and the reaction of hydrophilic groups of the graphene with one of the aforementioned gases to render these groups hydrophobic.

The inclusion of a catalyst in some inventive embodiments functions to promote alkane, alkene, or allyl incorporation into the graphene during the exfoliation production of the graphene. When alkanes, alkenes, allylics, or precursors therefor that gaseous or liquid under standard temperature and pressure (STP) (273 K. 1 atmosphere) are present in the atmosphere of the exfoliation cannister during the exfoliation production of the graphene.

In still other embodiments, the carboxylic acid specific reagent. N-cyclohexyl-N'-(2-morpholinoethyl)carbodiimide (CMC) is introduced during exfoliation under atmospheric conditions that favor reaction. (B. Prentice et al. J Am Soc Mass Spectrom. 2013; 24(1): 30-37). The resulting amide bonds are amenable to reaction including polymerization.

Figure 2:
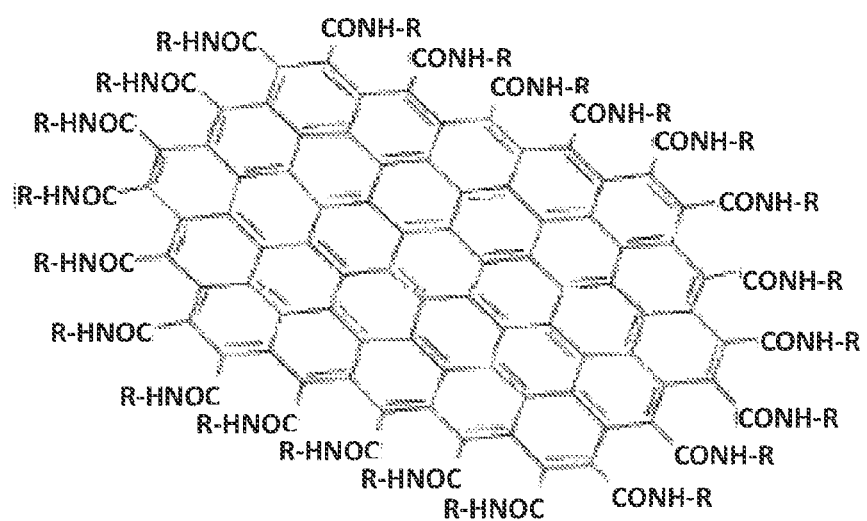
FIG. 2 is the chemical structure of FIG. 1 modified by an embodiment of the inventive process.

In other inventive embodiments, proximal carboxyl groups condense to form at an anhydride by exfoliating in a cannister heated to a temperature of between 260 to 400° C., and in still other embodiments at between 270 to 350° C., with a release of steam. The resulting anhydride groups are quite reactive compared to carboxyl groups and react with the gas phase introduction of a primary amine, $NH_2$—R creates an amide bond, CONH—R with the release of water as steam. (C. Moreno-Castillo et al., Carbon 1998; 36(1-2): 145-151). According to certain embodiments of the present invention, the primary amine is introduced into the exfoliation cannister after anhydride formation, as a gas, vapor or a liquid. The primary amine in some inventive embodiments is selected to yield a hydrophobic character to the resulting amide bond through selection of the extending R group. R groups operative herein include $C_1$-$C_8$ alkyls, $C_2$-$C_6$ alkenyls, $C_6$-$C_{12}$ aryls, and any of the aforementioned with a pendant moiety of $C_6$ aryl, methyl, ethyl, in place of a hydrogen atom. A graphene monolayer produced with the carboxylates of FIG. 1 reacted to create the amides CONH—R are shown in FIG. 2.

The resulting the layers of hydrophobic graphene range between 1 nm to 50 nm thickness. In still other embodiments, the layers of graphene range between 4 nm to 15 nm.

The functionalized graphene of the present invention presents a variety of advantages over similar materials taught by the prior art. Specifically, while high-energy ball-milling techniques used in the prior art tend to create carboxylate moieties in basal plane of graphene as well as in edge positions, the present invention reacts these carboxyl moieties during the exfoliation process of a graphitic precursor to render these moieties as chemically reduced aliphatics or otherwise as hydrophobic moieties. Without wishing to be bound to a particular theory, existing ball-milling techniques tend to introduce carboxyl moieties at sites where C—C bonds are fractured by the mechanical force of milling. As this is believed to be a lower energy occurrence in the basal plane relative to an edge, yet control is limited resulting in defects in both basal and edge sites. These defects are high energy sites and are susceptible to reaction with atmospheric moisture and/or oxygen, thereby resulting in the formation of the undesirable carboxyl moieties.

In specific inventive embodiments grafts are made to in-plane defects of the graphene.

In specific inventive embodiments microwaves are used for decoration with lithium or other metals to create controlled three dimensional (3D) graphene structures.

In some inventive embodiments, the graphene produced by the present invention is removed from the exfoliation cannister and filtered so as to separate the as produced graphene as to purity, size or a degree of functionalization, or a combination thereof. Filtration techniques operative herein include solvent extraction, size exclusion chromatography, affinity chromatography, and combinations thereof. To the extent that a dry powder is required, a filtrate is readily lyophilized to a dry powder. Chromatography media operative herein illustratively include silica, alumina, titania, resin beads, and chemically modified versions thereof.

Purification of the hydrophobic graphene in some embodiments also includes washing the exfoliated hydrophobic graphene in a solvent to preferentially suspend or dissolve contaminants thereto or graphene material as a function of hydrophilicity. The resulting washed material is readily dried in a stream of inert gas or via vacuum drying.

EXAMPLES

Example 1

Graphite material is loading into a cannister per US Patent Application Publication US2016/0201784A1. Palladium particulate with a diameter of 100 nm is added to 0.05 total weight percent of the graphitic material. (J. Turkevich et al., Science 1970, 169(3948): 873-879). The cannister is sealed by joining the cap and the evacuated. An atmosphere of argon is introduced and the canister is rotated at for 16 hours at a temperature of 350° C. Upon cooling, the cannister is opened and the graphene separated from the milling media.

Example 2

The procedure of Example 1 is repeated with an ethylene atmosphere in place of argon to obtain a modified graphene.

Example 3

The material produced by Example 1 is dispersed in a melt of polyethylene with a uniform dispersion being observed in the resulting cooled pellets formed from the melt. For comparison, conventional graphene produced by the procedure of Example 1 absent the palladium catalyst does not fully disperse under the same conditions in the same melt of polyethylene.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for in situ functionalization of graphene comprising:
   placing a graphitic precursor in an exfoliation cannister with exfoliation media;
   creating an inert atmosphere in said exfoliation cannister;
   exfoliating said graphitic precursor to form graphene having carboxyl moieties; and
   reacting the carboxyl moieties in said exfoliation cannister under conditions and in the presence of a substance to chemically reduce or react the carboxyl moieties during the exfoliating to produce hydrophobic graphene,
   wherein the substance is a reagent of N-cyclohexyl-N'-(2-morpholinoethyl) carbodiimide (CMC).

2. The process of claim 1 wherein said conditions are a temperature of between 26° and 500° C.

3. The process of claim 1 wherein said substance further comprises an alkane, an alkene, an allyl, or a combination thereof, said substance being gaseous or liquid under standard temperature and pressure (STP).

4. The process of claim 1 wherein said inert atmosphere is nitrogen, argon, carbon dioxide, ethylene gas, fluorinated gases, phosphorus containing gases, or combinations thereof.

5. The process of claim 1 wherein said reacting the carboxyl moieties in said exfoliation cannister yields an intermediate anhydride.

6. The process of claim 5 further comprising reacting said intermediate anhydride with a primary amine to form an amide.

* * * * *

UNITED STATES PATENT AND TRADEMARK OFFICE
CERTIFICATE OF CORRECTION

PATENT NO. : 12,286,353 B2  
APPLICATION NO. : 18/601495  
DATED : April 29, 2025  
INVENTOR(S) : Leroy Magwood et al.

Page 1 of 1

It is certified that error appears in the above-identified patent and that said Letters Patent is hereby corrected as shown below:

In the Claims

Column 6, Claim 2, Line 14:
"26°"
Should read:
--260°--

Signed and Sealed this
Eighth Day of July, 2025

Coke Morgan Stewart
*Acting Director of the United States Patent and Trademark Office*